(12) United States Patent
Ballantyne et al.

(10) Patent No.: US 6,774,508 B2
(45) Date of Patent: Aug. 10, 2004

(54) DUAL MODE POWER SUPPLY

(75) Inventors: Gary J. Ballantyne, Christchurch (NZ); Keith Bargroff, San Diego, CA (US); Paul L. Chan, Encinitas, CA (US); Jonathan Klaren, San Diego, CA (US); Charles J. Persico, Rancho Santa Fe, CA (US); Walter Scott Charles, San Diego, CA (US); Somphou Sithideth, Spring Valley, CA (US)

(73) Assignee: Qualcomm Incorporated, San Diego, CA (US)

( * ) Notice: Subject to any disclaimer, the term of this patent is extended or adjusted under 35 U.S.C. 154(b) by 354 days.

(21) Appl. No.: 09/898,680

(22) Filed: Jul. 3, 2001

(65) Prior Publication Data

US 2003/0006651 A1 Jan. 9, 2003

(51) Int. Cl.$^7$ ................................................ H02J 3/00
(52) U.S. Cl. ......................................................... 307/85
(58) Field of Search .............................. 307/85, 64, 66; 320/135, DIG. 14

(56) References Cited

U.S. PATENT DOCUMENTS

| 5,686,813 A | 11/1997 | Huen et al. |
| 6,153,949 A | 11/2000 | Söderhäll |

FOREIGN PATENT DOCUMENTS

| EP | 0546652 | 6/1993 |

*Primary Examiner*—Gregory J. Toatley, Jr.
(74) *Attorney, Agent, or Firm*—Philip Wadsworth; Charles D. Brown; Howard H. Seo

(57) ABSTRACT

A battery (102) powers a wireless telephone's power amplifier (106) through a Switch Mode Power Supply (SMPS) (104). The SMPS has a capacity lower than the maximum power requirements of the amplifier. When a controller (116) senses that an amplifier power-requirement threshold has been exceeded, it closes a switch (114) parallel to the SMPS, allowing power to flow from the battery to the amplifier without passing through the SMPS. This architecture allows the use of a smaller SMPS, and eliminates SMPS-generated noise to the amplifier when the amplifier is least able to tolerate such noise, namely, under high power conditions.

15 Claims, 2 Drawing Sheets

DUAL MODE POWER SUPPLY

BACKGROUND OF THE INVENTION

1. Technical Field

This invention relates to power supplies and has particular relation to power supplies which can supply power efficiently at light loads and low voltages and with low noise at heavy loads.

2. Background Art

Transceivers, especially for wireless telephones, have a number of requirements. The telephone is usually battery powered, which means that the power supply must be efficient in order to extend battery life between recharges. The telephone is usually portable, which means that it (and therefore its power supply) must be both compact and light. Finally, the (mobile) telephone is in communication with a (fixed) base station, which means that the distance between the telephone and the base station will vary widely. This in turn means that the power required for sending and receiving signals will also vary widely.

The Switch Mode Power Supply (SMPS) is a DC-to-DC power supply. The SMPS design makes it very efficient, and thus makes it widely used in wireless telephones and other battery-powered electronic devices. As the name implies, it rapidly switches a DC voltage on and off, but with a well-controlled duty cycle, thus allowing the output voltage to be similarly well controlled. This good control extends over a broad range of battery conditions and an even broader range of power demands. The size of the SMPS is generally selected to be as small (compact, light, and cheap) as possible while still assuring that the maximum designed power requirements of the telephone (or other load) will be met.

SUMMARY OF THE INVENTION

Applicant has noted a design opportunity which has been overlooked by the prior art: when a load has a requirement for varying amounts of power, a low voltage is beneficial during low power conditions, and low noise is required during high power conditions.

When the power supply load power requirement is low a low voltage is beneficial if, for instance, the current drawn by the load is largely insensitive to the applied voltage. This is true when the load is a typical radio frequency power amplifier in a wireless telephone. In this case a lower voltage reduces the power drawn from the battery.

Using again the example of a mobile telephone power amplifier, it is important that the power supply has low noise and high voltage when the amplifier presents a heavy load. In this case the transmitted power is high, and (in advanced systems, such as cdmaOne or cdma2000), the received power is low. When the received power is low it is vital that the power supply does not introduce excessive noise into the system that could mask the received signal. The high voltage allows the high transmitted power to be more easily generated.

To achieve these joint goals (low noise and high voltage at high power and low voltage at low power) the applicant employs a SMPS at low power and bypasses the SMPS at high power. This has a number of advantages. Since, for high power demands, power flows from the battery to the power amplifier without passing through the SMPS, no noise from the SMPS is introduced into the power amplifier. Because the SMPS does not have to handle this top portion of the load's power requirements, it can be made more compact, lighter, and cheaper. Because it is smaller, the SMPS consumes lower power itself, even when it is switched into the circuit—and, of course, consumes no power at all when it is switched out of the circuit. Most importantly, power consumption by the power amplifier is reduced. When the transition between the SMPS and bypass is properly arranged the power amplifier can spend the majority of time operating from an economical low voltage. This is especially true when operating within a system with advanced power control, such as cdmaOne or cdma2000.

DETAILED DESCRIPTION OF THE PREFERRED EMBODIMENTS

Figure 1:
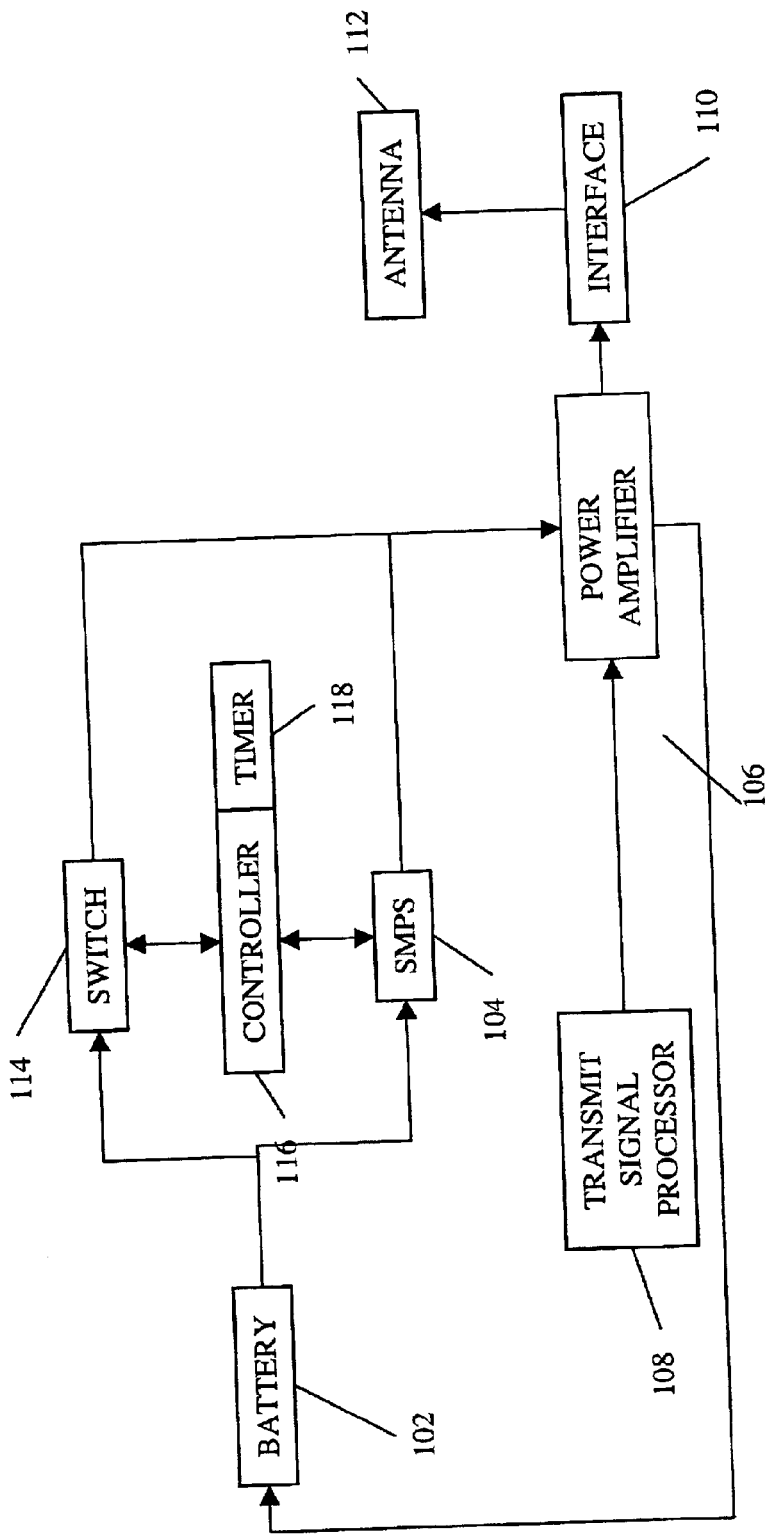
FIG. 1 is a block diagram of an apparatus embodiment of the present invention.

FIG. 1 is a block diagram of an apparatus embodiment 100 of the present invention.

In the prior art, current would flow from a battery 102 to a Switch Mode Power Supply (SMPS) 104, then to a transceiver power amplifier 106, and then back to the battery. The power amplifier would take signals from a transmit signal processor 108, amplify them, apply the amplified signals to an interface 110, and transmit them via an antenna 112.

For a given output power from the power amplifier 106 to the interface 110, the power amplifier draws essentially a constant current from the battery 102 for a range of applied voltages. This is true as long as the applied voltage (from the SMPS 104 or otherwise) allows the given output power to be reached. Thus, for high output power it is desirable to power the amplifier 106 from the battery, without going through the SMPS 104, so that the amplifier will have the maximum available voltage. For lower requirements of output power from the amplifier 106, the voltage applied to the amplifier 106 can be reduced. Since the current into the amplifier 106 is approximately the same, and the SMPS is efficient, the current from the battery is reduced and there is a power consumption benefit.

FIG. 1 shows an embodiment of the invention in which a switch 114 has been added in parallel to the SMPS 104, and the SMPS 104 is made with a capacity which is lower than the maximum power requirement for the power amplifier 106. A controller 116 senses what the power requirement is for the power amplifier. This sensing can come from the SMPS 104, the switch 114, or any other component shown in FIG. 1, or may come from an externally supplied command. Often the base station with which a wireless telephone is in contact controls the telephone's power setting. This is particularly true in Code Division Multiple Access (CDMA) wireless telephones.

When that power requirement exceeds some predetermined threshold, the controller 116 closes the switch 114. This in turn allows current (and power) to flow from the battery 102 to the power amplifier 106 without passing through the SMPS 104. When the power requirement falls back below the threshold, the controller 116 re-opens the switch 114. Using a first threshold when power requirements are increasing, and a second (and lower) threshold when power requirements are decreasing, will introduce desirable hysteresis. This prevents the switch 114 from repeatedly opening and re-closing when power requirements hover near the threshold, which would undesirably inject noise into the system.

Hysteresis may also be introduced by inserting a timer 118 into the controller 116, so that the switch 114 does not close until a predetermined period of time has elapsed since the switch was last opened, or so that the switch 114 does not open until a predetermined period of time has elapsed since the switch was last closed, or both. This timer-provided hysteresis may be introduced instead of, or in addition to, the threshold-provided hysteresis described above.

When the parallel switch 114 is closed, the typical SMPS 104 senses the reduction in voltage drop and stops operating. If the SMPS 104 is not typical, it may be removed from the circuit by opening one or more series switches (not shown).

When the switch 114 is closed, the power amplifier 106 can no longer rely on a particular voltage level being supplied to it. The power amplifier 106 must therefore be structured to tolerate varying voltage levels during high power conditions. Designing such a structure is well within the ordinary skill in the art, especially since such tolerance is not required during medium and low power conditions.

If the capacity of the SMPS 104 can be tailored to the requirements of the system, then the threshold is typically selected to be equal to this capacity. Both of these two parameters are generally set to minimize the average power consumption, under both high-power and low-power conditions, of the power amplifier 106. Such minimization often results in, or at least approximates, an overall minimum in average power consumption of the entire telephone. Sometime the desired figure of merit includes other factors (cost, bulk, weight, etc.) which are more important than power amplifier power consumption in the application at hand. In such situations, these two parameters should be adjusted accordingly. Routine software simulations can be used to calculate the capacity and threshold (or thresholds, if hysteresis is used).

Sometimes an SMPS 104 of exactly the right size is not available, and the next larger size must be used. In this case, the threshold can be set either at the capacity of the SMPS 104 or at any convenient lower level. As before, the actual level selected is usually the level which is required to minimize power consumption by the power amplifier 106, although (also as before) other figures of merit may apply in the application at hand.

FIG. 1 shows the controller 116 as being distinct from the SMPS 104, power amplifier 106, or switch 114. It is often convenient to build the controller as a separate component. In other situations, the controller is a part of the SMPS, power amplifier, or switch, and is separate only in concept.

FIG. 1 shows the SMPS 104 driving a power amplifier 106. However, the power amplifier 106 may be replaced with any load having a requirement for varying amounts of power, the power having low noise during high power conditions. Likewise, the switch 114 may be replaced with any convenient means for applying power from the battery 102 to the load 106 without passing through the SMPS 104. Indeed, the battery 102 may itself be replaced with any power source which has sufficiently low noise under high power conditions, and which has an unregulated voltage (under high power conditions) which can be tolerated by the load 106.

Figure 2:
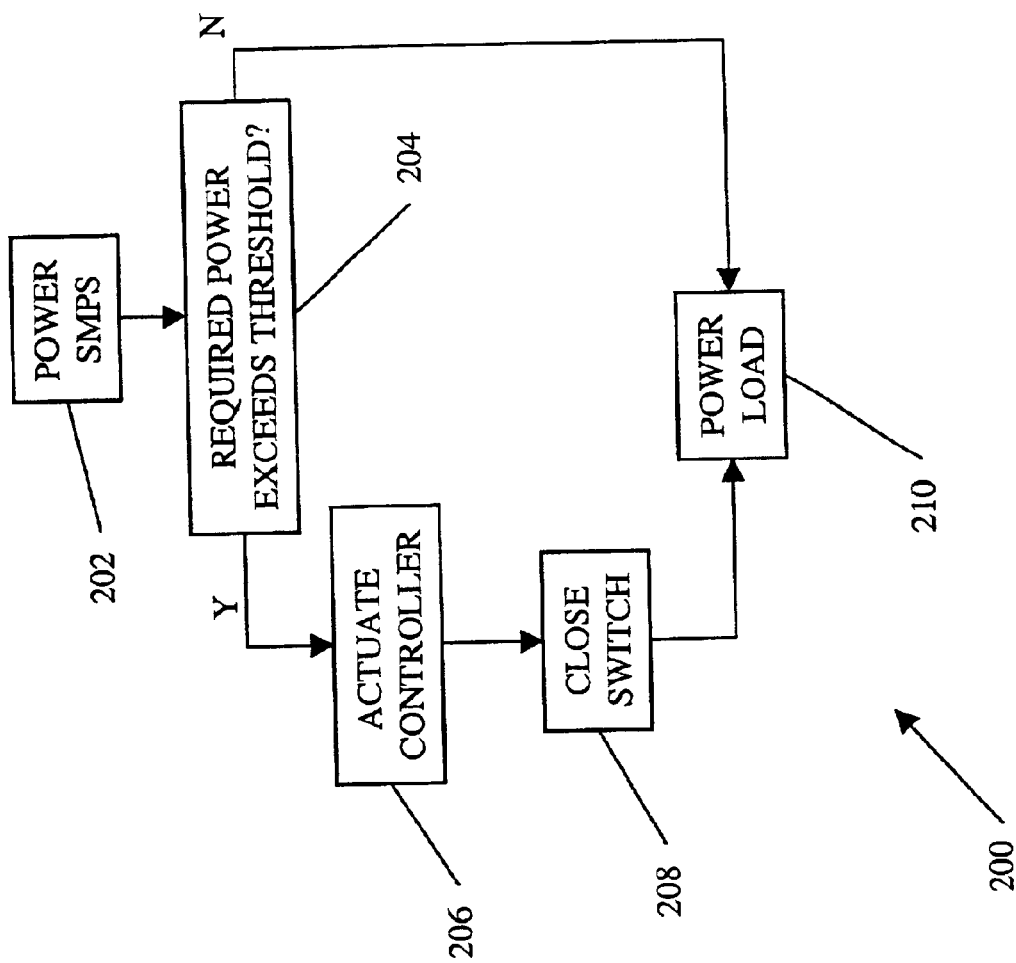
FIG. 2 is a flowchart of a method embodiment of the present invention.

FIG. 2 is a flowchart of a method embodiment 200 of the present invention. Under ordinary circumstances, the SMPS is powered 202. If the power required by the load exceeds the threshold 204, then a controller is actuated 206, which closes a switch 208 to take the SMPS out of the circuit, and the load is powered 210 without the SMPS. If the power required by the load does not exceed the threshold 204, then powering of the load 210 continues with the SMPS in the circuit. Separate thresholds are, as noted above, often desirable in introducing hysteresis.

Industrial Application

This invention is capable of exploitation in industry, and can be made and used, whenever is it desired to economically power a load with a switch mode power supply.

While various modes of apparatus and method have been described, the true spirit and scope of the invention are not limited thereto, but are limited only by the following claims and their equivalents, and such are claimed as the invention.

What is claimed is:

1. An reduced-average-power electronic circuit comprising: a power source; a switch mode power supply (SMPS) powered by the power source, the SMPS having a capacity which is lower than the maximum power requirement for the hereafter-recited load; a load, powered by the SMPS, having a requirement for varying amounts of power, the power having low noise during high power conditions and the load tolerating a low voltage during low power conditions; and means for applying power from the power source to the load without passing through the SMPS when the applied power is higher than a threshold, the threshold being lower than or equal to the capacity of the SMPS, wherein the means for applying power from the power source to the load without passing through the SMPS comprises a switch in parallel with the SMPS;

wherein the switch is coupled to a controller which is structured to close the switch when the applied power is higher than the threshold and to open the switch when the applied power is lower than the threshold; and wherein the controller further comprises a timer which is structured; to delay closing the switch, when the applied power is higher than the threshold, until a predetermined period of time has elapsed since the switch was last opened; or to delay opening the switch, when the applied power is lower than the threshold, until a predetermined period of time has elapsed since the switch was last closed; or both.

2. The electronic circuit of claim 1, wherein the power source comprises a battery.

3. The electronic circuit of claim 1, wherein the load comprises a transceiver power amplifier.

4. The electronic circuit of claim 1, wherein the threshold comprises a first threshold and a second threshold which is lower than the first threshold, and wherein the controller is structured to open the switch when the applied power is lower than a second threshold, thereby introducing hysteresis between closing the switch at the higher first threshold and opening the switch at the lower second threshold.

5. The electronic circuit of claim 4, wherein the controller further comprises a timer which is structured: to delay closing the switch, when the applied power is higher than the threshold, until a predetermined period of time has elapsed since the switch was last opened; or to delay opening the switch, when the applied power is lower than the threshold, until a predetermined period of time has elapsed since the switch was last closed; or both.

6. A method for supplying a reduced average power to a load, comprising the steps of: powering a switch mode power supply (SMPS) with a power source; powering the load with the SMPS; and applying power from the power source to the load without passing through the SMPS when the applied power is higher than a threshold; wherein: the load has a requirement for varying amounts of power; the power source has low noise during high power conditions and the load tolerating a low voltage during low power conditions; the SMPS has a capacity which is lower than the maximum power requirement for the load; and the threshold is lower than or equal to the capacity of the SMPS, wherein the step of applying power from the power source to the load without passing through the SMPS comprises the step of closing a switch in parallel with the SMPS;

wherein the step of closing the switch is preceded by the step of actuating a controller which is coupled to the switch, and which is actuated when the applied power is higher than the threshold; and delaying closing the switch, when the applied power is higher than the threshold, until the predetermined period of time has elapsed since the switch was last opened; or delaying opening the switch, when the applied power is lower than the threshold, until a predetermined period of time has elapsed since the switch was last closed; or both.

7. The method of claim 6, wherein the power source comprises a battery.

8. The method of claim 6, wherein the load comprises a transceiver power amplifier.

9. The method of claim 6, wherein the threshold comprises a first threshold and a second threshold which is lower than the first threshold, and wherein the method further comprises the steps of: opening the switch when the applied power is lower than the second threshold; and closing the switch when the applied power is higher than the second threshold; thereby introducing hysteresis between closing the switch at the higher first threshold and opening the switch at the lower second threshold.

10. The method of claim 9, further comprising the steps of: delaying closing the switch, when the applied power is higher than the threshold, until a predetermined period of time has elapsed since the switch was last opened; or delaying opening the switch, when the applied power is lower than the threshold, until a predetermined period of time has elapsed since the switch was last closed; or both.

11. Apparatus for supplying a reduced average power to a load, comprising: means for powering a switch mode power supply (SMPS) with a power source; means for powering the load with the SMPS; and means for applying power from the power source to the load without passing through the SMPS when the applied power is higher than a threshold; wherein: the load has a requirement for varying amounts of power; the load tolerates a low voltage during low power conditions; the power source has low noise during high power conditions; the SMPS has a capacity which is lower than the maximum power requirement for the load; and the threshold is lower than or equal to the capacity of the SMPS, wherein the means for applying power from the power source to the load without passing through the SMPS comprises means for closing a switch in parallel with the SMPS;

wherein the means for closing the switch is coupled to preceding means for actuating a controller which is coupled to the switch, and which is actuated when the applied power is higher than the threshold; and means for delaying closing the switch, when the applied power is higher than the threshold, until a predetermined period of time has elapsed since the switch was last opened; or means for delaying opening the switch, when the applied power is lower than the threshold, until a predetermined period of time has elapsed since the switch was last closed; or both.

12. The apparatus of claim 11, wherein the power source comprises a battery.

13. The apparatus of claim 11, wherein the load comprises a transceiver power amplifier.

14. The apparatus of claim 11, wherein the threshold comprises a first threshold and a second threshold which is lower than the first threshold, and wherein the apparatus further comprises: means for opening the switch when the applied power is lower than the second threshold; and means for closing the switch when the applied power is higher than the second threshold; thereby introducing hysteresis between closing the switch at the higher first threshold and opening the switch at the lower second threshold.

15. The method of claim 14, further comprising: means for delaying closing the switch, when the applied power is higher than the threshold, until a predetermined period of time has elapsed since the switch was last opened; or means for delaying opening the switch, when the applied power is lower than the threshold, until a predetermined period of time has elapsed since the switch was last closed; or both.

* * * * *

UNITED STATES PATENT AND TRADEMARK OFFICE
CERTIFICATE OF CORRECTION

PATENT NO. : 6,774,508 B2
DATED : August 10, 2004
INVENTOR(S) : Gary J. Ballantyne et al.

It is certified that error appears in the above-identified patent and that said Letters Patent is hereby corrected as shown below:

<u>Title page,</u>
Item [75], Inventors, please change "Walter Scott Charles" to -- Walter Scott --.

Signed and Sealed this

Fifteenth Day of November, 2005

JON W. DUDAS
*Director of the United States Patent and Trademark Office*